(12) United States Patent
Fritz et al.

(10) Patent No.: US 10,808,367 B2
(45) Date of Patent: Oct. 20, 2020

(54) SELF-PROPELLED CONSTRUCTION MACHINE AND PROCESS FOR CONTROL OF A SELF-PROPELLED CONSTRUCTION MACHINE

(71) Applicant: Wirtgen GmbH, Windhagen (DE)

(72) Inventors: Matthias Fritz, Hennef (DE); Martin Lenz, Großmaischeid (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 62 days.

(21) Appl. No.: 16/178,293

(22) Filed: Nov. 1, 2018

(65) Prior Publication Data

US 2019/0145058 A1 May 16, 2019

(30) Foreign Application Priority Data

Nov. 12, 2017 (DE) .......................... 10 2017 010 425

(51) Int. Cl.
*E01C 19/00* (2006.01)
*G05D 1/02* (2020.01)
(Continued)

(52) U.S. Cl.
CPC ........ *E01C 19/004* (2013.01); *G01C 21/3664* (2013.01); *G05D 1/0212* (2013.01);
(Continued)

(58) Field of Classification Search
CPC ............................ E01C 19/004; G05D 1/0212
See application file for complete search history.

(56) References Cited

U.S. PATENT DOCUMENTS 5,044,820 A 9/1991 Prang
6,311,098 B1 * 10/2001 Higasayama ...... G05B 19/4099
700/159
(Continued)

FOREIGN PATENT DOCUMENTS

DE 3909583 A1 10/1990
DE 19755324 A1 6/1999
(Continued)

OTHER PUBLICATIONS

European Patent Search for corresponding European Patent application EP18203929 dated Feb. 5, 2019, 8 pages (not prior art).

*Primary Examiner* — Anne Marie Antonucci
*Assistant Examiner* — Abdalla A Khaled
(74) *Attorney, Agent, or Firm* — Lucian Wayne Beavers; Gary L. Montle; Patterson Intellectual Property Law, PC (57) ABSTRACT

A self-propelled construction machine comprises a control unit configured in such a way that a point of reference on the construction machine moves along a route. A processing unit is configured in such a way that the position of at least one kink on the target route is determined from the imported data, at least a portion of the target route is displayed, and, for the section of the target route in which the target route has the kink, an interpolation curve that is substantially free of kinks is calculated. The relevant section of the target route is replaced by the interpolation curve for the determination of a modelled route. The control of the drive device is then not based upon the predetermined target route, but rather the modelled target route.

20 Claims, 10 Drawing Sheets

(51) Int. Cl.
*G01C 21/36* (2006.01)
*G06F 3/0488* (2013.01)
*E01C 19/48* (2006.01)

(52) U.S. Cl.
CPC ......... *G05D 1/0214* (2013.01); *G06F 3/0488* (2013.01); *E01C 19/48* (2013.01); *G05D 2201/0202* (2013.01)

(56) References Cited

U.S. PATENT DOCUMENTS

| | | | |
|---|---|---|---|
| 6,481,924 B1 | 11/2002 | Smolders et al. | |
| 6,671,600 B1 | 12/2003 | Hintzy | |
| 6,782,306 B2 * | 8/2004 | Yutkowitz | G05B 19/4103 700/159 |
| 6,922,606 B1 * | 7/2005 | Yutkowitz | G05B 19/00 318/560 |
| 8,989,968 B2 * | 3/2015 | Fritz | E01C 19/42 701/50 |
| 2015/0176990 A1 | 6/2015 | Fritz et al. | |

FOREIGN PATENT DOCUMENTS

| | | |
|---|---|---|
| DE | 60002830 T2 | 1/2004 |
| EP | 1103659 A2 | 5/2001 |
| EP | 2719829 A1 | 4/2014 |

* cited by examiner

SELF-PROPELLED CONSTRUCTION MACHINE AND PROCESS FOR CONTROL OF A SELF-PROPELLED CONSTRUCTION MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. 10 2017 010 425.5, filed Nov. 12, 2017, which is hereby incorporated by reference.

BACKGROUND

The invention relates to a self-propelled construction machine, in particular a slipform paver, and to a process for control of a self-propelled construction machine.

Self-propelled construction machines are characterized by the fact that they have a work device arranged on a machine frame for the construction of building structures on a site or for the modification of the site. Slipform pavers or road milling machines belong, for example, to the group of known self-propelled construction machines.

In the case of slipform pavers, the work device includes an apparatus for the shaping of flowable material, in particular concrete, which will hereinafter be referred to as a concrete mixer. With the concrete mixer it is possible to produce building structures having various formations, for example, protective concrete walls or traffic islands. A slipform paver is, for example, described in EP 1 103 659 B1.

In the case of the work device of the road milling machines, this refers to a milling device that features a milling/cutting roller equipped with milling or cutting tools and by which material can be removed from the site in a predetermined working width.

The self-propelled construction machines furthermore have a drive device for the execution of translatory and/or rotational motions of the construction machine at the site as well as a control unit for the control of the drive device.

For the construction of building structures on the site or for modification of the site, in the case of self-propelled construction machines, one seeks to have a substantially automatic control of the construction machine without any noteworthy interventions of the vehicle operator. In the case of automatic control of the construction machine, the drive device of the construction machine is controlled in such a way that a point of reference on the construction machine is moved along a predetermined target route, which is to say, on the route or at a pre-set distance to the route, in order to construct a building structure or modify the site. In doing so, the target route can be described by individual segments, which can be straight or curved.

A known process for the control of self-propelled construction machines prescribes the use of a stringline, by which the target route or a point equidistant to the target route is specified.

Self-propelled construction machines can also be controlled by making use of a total station for position determination or a GNSS (Global Navigation Satellite System).

For the automatic control of the construction machine, the target route is determined in the data describing the site. This data can be coordinated in a two or three-dimensional system of coordinates that is independent of the construction machine. The determination of the data can take place by means of a computer in an office that is away from the building site. During the operation of the construction machine, an ongoing comparison between the actual position of the construction machine, or alternatively its work device, and the desired position is carried out in such a way that the construction machine, or alternatively its work device, is moved along the target route.

In the case, for example, of a slipform paver, the concrete mixer should move along a target route that was preset in the planning, in order to, for example, produce a concrete protection wall on the ground surface. In doing so, it is not only necessary to take into consideration the motion in the plane of a point of reference on the construction machine, or alternatively its work device, but rather also a modification of the height of the point of reference; for example, in the case of a slipform paver, one must adjust the height of the concrete mixer above the ground surface in order to establish the construction height. The same also holds true for the road milling machine.

The point of reference of the construction machine should execute a possibly uniform motion in space during the forward motion. In the case in which the control of the construction machine is executed with a stringline, the stringline is tensioned on the marked-out route while taking into consideration the local circumstances or constraints, for example, water inlets. Anchors, to which the stringline is fastened, are set out in the site for the tensioning of the stringline. The anchors should be laid out in such a way that stringline can be tensioned without kinks. The use of a stringline has the advantage that its course in the building site can readily be verified and corrected by the movement of the anchors. On the building site it is simple to recognize kinks during the pacing off of the marked-off route, since the course of the stringline can readily be measured by eyeballing. The avoidance of kinks leads the construction machine or its work device to execute a uniform motion.

The control of the construction machine by means of a total station, or a GNSS system using a digital model, makes it impossible to easily visually verify the prescribed route for kinks, since the route is solely described by means of columns of figures, which cannot consider a kink. Furthermore, the known controls of construction machines with a total station or a GNSS system do not allow for the processing, or alternatively modification, of the data that was previously compiled and that describes the route. There is therefore the risk that the motion of the construction machine or its work device is not uniform. In practice, the specification of the route can lead to the situation where, at specific points of the route, the required adjustment of the steering angle of the running gear or the modification of the setting of the lifting columns exceeds a tolerable magnitude. As a consequence, it cannot be ensured that the desired work result can be achieved.

BRIEF SUMMARY OF THE INVENTION

An object of the invention is to provide a self-propelled construction machine, in particular a slipform paver, which can readily achieve the desired work result without great effort. It is also an object of the invention to provide a self-propelled construction machine, in particular a slipform paver, by which an improved work result can be achieved.

Another object of the invention is to, in practice, ensure a uniform motion of the construction machine even when the control of the machine takes place without using a stringline.

These objects are achieved according to the invention by the features of the independent claims. The subject matter of the dependent claims refers to individual embodiments of the invention.

The self-propelled construction machine according to the invention has a machine frame and a drive device for the driving of the construction machine. The construction machine furthermore has a work device that is arranged on the machine frame for the construction of building structures on a site, for example, a concrete mixer, or for the modification of the site, for example, a milling or cutting roller.

A drive device should be understood as being all of the following components or assemblies (power units) of the construction machine which serve to move the construction machine forward in the site. These components or power units do not only include the running gear, for example, crawler tracks or wheels, upon which the construction machine is mounted, and the devices to drive the running gear, for example, hydraulic motors or an internal combustion engine, but rather also devices for height adjustment of the machine frame or alternatively of the work device in relation to the ground surface, for example, lifting columns to which the running gear are fastened. These components or assemblies of the drive device of the construction machine permit a motion of a point of reference on the construction machine along a route, which is to say, on the route or at a predetermined distance to the route (at an equidistant point). This route can be a trajectory in space or in a plane. In the case in which the trajectory is a three-dimensional trajectory, it is also possible that changes in height are taken into consideration, for example, the adjustment of the height of the work device in relation to the ground surface.

Moreover, the construction machine exhibits an interface for importing data which describe a target route, which can be specified in the planning off-site. It is thus possible that the data can be determined off-site in an office and then transmitted to and imported by means of the interface. The target route can be described in any system of coordinates. The target route can also be described by using mileage/kilometer readings.

The interface can, for example, be a USB interface, a Bluetooth-standard interface, an infrared interface, a LAN or a WLAN. It is also possible that an interface can be achieved with a data drive, in order to be able to import the data using a data carrier selected at will. A memory unit is provided for the storage of the data that has been imported via the interface and which describes the target route is described. The memory unit can, for example, be the working memory of a computer, a RAM (Random Access Memory) or a flash memory, or any other known form of memory.

In addition, the construction machine has a control unit that is configured in such a way that a point of reference on the construction machine moves along a route. The control unit controls the individual components or power units of the drive device in such a way that the construction machine moves along the predetermined route, which for example, can be described by means of Cartesian coordinates in a Cartesian system of coordinates or polar coordinates in a polar system of coordinates. The control unit can be an element of a central control device of the construction machine on which a control program runs that controls the individual components or assemblies of the construction machine. The control device can, for example, include a programmable logic control (PLC), which can comprise a microcontroller.

The construction machine according to the invention is characterized by a route modelling device which includes an input unit, a display unit and a processing unit. The processing unit of the route modelling device can be either a component of a central control device of the construction machine or an independent unit.

The route modelling device is configured in such a way that the position of at least one kink in the target route is determined by means of the data imported via the interface, provided that one or more kinks are present and the target route in any case is not a smooth curve. Determination of the position of a kink should be understood to mean the identification of a kink on the target route. Preferably, all kinks in the target route are identified at the beginning of the construction project. When the target route is made up of a plurality of elements, for example, straights and curves, the points of contact of the individual elements are potential kinks, which are readily identified. It is, however, also possible to verify the course of the target route for the presence of kinks using known mathematical processes.

The route modelling device is furthermore configured in such a way that at least one portion of the target route is displayed, in which the target route has a kink. The display of at least one portion of the target route occurs with the display unit. Preferably, at the start of the construction project, the entire course of the target route is initially displayed, which includes all kinks, in order for the user to be able to later select individual sections of the target route. Moreover, the route modelling device is configured in such a way that in the at least one portion of the target route, one section of the route in which the target route has the kink is automatically determined by the processing unit or can be determined by the user. This does not however preclude that there cannot also be additional kinks in the section when the target route has a plurality of kinks.

If a plurality of kinks is present, it is possible to have the individual sections displayed one after another. Frameworks in which the target route can be modelled can be determined for the individual sections. The frameworks can each contain one or more kinks.

The route modelling device enables the visualization of specified locations on the target route that would lead to a non-uniform motion of the construction machine. As a consequence, the vehicle operator can immediately get a picture as to whether corrections of the route are necessary. Using the route modelling device, it is then possible to model the individual sections of the target route in such a way that the target route, which may exhibit individual segments such as straights and curves, is substantially without kinks. The magnitude of the tolerated deviation from a completely unkinked, which is to say, smooth, curve can be set out by the user on their own.

The modelling of the target route takes place by means of the route modelling device with computer assistance. The route modelling device is configured in such a way that for the section of the target route in which the target route has the kink, a substantially kink-free, preferably smooth, interpolation curve is calculated. The interpolation curve should be obtained in such a way that the transitions to the target route too are substantially free of kinks, preferably entirely free of kinks. All known mathematical processes can be implemented in the processing unit for the determination of the interpolation curve. The interpolation curve can, for example, be described by means of an nth degree polynomial. The known methods, which only require comparatively limited computational power, are advantageous. This includes approximation with the known spline-functions. In the case of a particularly preferred embodiment, the interpolation curve is a curve combining two circles, wherein at the point in which the two circles meet, the curve has the same tangent (biarc). The interpolation curve can also be formed by a plurality of, preferentially two, curves, which each combine two circles.

For the determination of a modelled route, the section of the target route in which the target route has a kink is replaced by the interpolation curve. The control of the drive device is then not based upon the predetermined target route, but rather upon the modelled target route, in such a way that the point of reference of the construction machine moves along the modelled route. In this way, the motion of the construction machine is overall more uniform.

The modelling of the target route can take place separately for the specification of a route in a horizontal plane and for the specification in a vertical plane for the setting of the height. For a separate modelling, it is possible that there is a first target route which describes the route in the plane, and a second target route which describes the elevation profile. Both routes can be evaluated independently one from another for the presence of kinks using the modelling device. Individual sections of the route for the elevation profile can be displayed and modelled in an analogous manner to the modelling of the route in the plane. It is, however, also possible to forego a modelling of the elevation profile.

In one embodiment, the route modelling device is configured in such a way that, at one location of the target route, the left-sided deflection and the right-sided deflection are calculated, and that the left-sided deflection and the right-sided deflection at the location of the target route are compared with one another. The deflection corresponds to the slope or alternatively to the direction of a tangent in the route in the relevant location. The value of the difference between the left-sided and right-sided deflection is a dimension for the thickness of the kink at the point of the target route. When the value of the difference between the left-sided and right-sided deflection is compared with a predetermined threshold value, it is possible to differentiate between a tolerable kink and a no longer tolerable kink. The threshold value which determines the tolerable dimension of the deviation from a smooth curve can be a set predetermined value that is also stored in a memory unit or can be input by the user using the input unit. It can be concluded that there is a kink as such when the left-sided and right-sided deflections at the relevant location are different.

A location of the target route should be understood to mean any arbitrary point of the target route. The target route can pass through a first verification point and a second verification point, in particular their starting and end points, and be verified for the presence of kinks in a plurality of locations.

In the case in which, for example, the target route is made up of only elements which are straight, for the determination of the coordinates (position) of a kink, it is possible to determine the change in direction of the target route as the route passes between successive elements and to take the determined change in direction and compare it with a predetermined threshold value for the change in direction. In the case of a succession of straight elements, the kinks are the locations of the route at which the end of one straight element comes into contact with the end of the other straight element when the straights form an angle, which is to say that the direction changes as one proceeds along the route.

In the case of a curved route, the change in the curve can be verified as one proceeds along the route in order to detect kinks. An abrupt change of the curve at a location of the route is a kink.

The verification of the target route for kinks can take place between a first and a second verification point. The verification points can be the starting point—or alternatively the end point of the target route. They can however also be points in the route found between the starting point and the end point if the entire route does not need to be verified for the presence of kinks.

For the visualization of kinks on the target route, the route modelling device can be configured in such a way that the information describing the location of kinks of the target route can be displayed by the display unit, for example by markings, in particular, points on the route, and information describing changes in direction at the kinks can be displayed, for example by stating the required change in direction in angular degrees. As an example, in the case of a passage from a straight section to another straight section which forms an angle of 45°, a change in the direction through an angle of 45° is necessary, for which purpose the setting of the running gear would need to be correspondingly changed.

Using the same computer algorithms, the route modelling device can once again verify the modelled route for the presence of kinks even after the modelling of the target route.

An embodiment of the route modelling element provides that the route modelling element is configured in such a way that a first point of support and a second point of support, between which the section of the route is found, are defined for the definition of the section of the target route that is to be modelled and the coordinates of the first and second points of support are stored in the memory unit. For the section of the target route in which the target route has the kink, a smooth interpolation curve, which is to say one substantially without kinks, which transitions to the target route without kinks at the points of support is calculated.

A further embodiment of the route modelling device provides that the route modelling device is configured in such a way that in the section of the target route, in which the target route has the kink, a third point of support is determined, the coordinates of which are stored in the memory unit. A smooth interpolation curve which runs through the first and the second points of support, as well as also the third point of support is calculated for this section of the target route. The third point of support can be any point in the concerned section of the target route. A preferred embodiment provides that the third point of support is the kink that has been determined.

The first and/or second and/or third point of support can be the points of support specified by the processing unit or can be points of support predetermined or selected by the user. The route modelling device can also be configured in such a way that the location of the points of support that are predetermined by the processing unit or selected by the user are modifiable. The points of support can initially be predefined by the processing unit or the user and subsequently moved by the user.

The route modelling device allows the user to stretch the interpolation curve in the manner of an "elastic band" between the first and second points of support and to have the "elastic band" reach the third point of support. The selection and the displacement of the individual points of support allow for a targeted modelling of the interpolation curve, wherein the result of the modelling is visible for the user by means of the display unit. As a consequence, the user can select a route from a plurality of possible curve progressions that are free of kinks and that meet their expectations.

The route modelling element can also be configured in such a way that a section of the target route is predetermined or predeterminable, in which the target route does not only have one, but rather a plurality of, kinks, wherein the at least two kinks are points of support of the interpolation curve.

The input unit and display unit of the route modelling device can comprise a touch-sensitive screen and/or a screen having an input device, in particular a computer mouse, in such a way that the program sequence of the processing unit is controlled by touching portions of the screen and/or by operating the input apparatus. The input apparatus can also comprise a keyboard or operating elements, such as switches, buttons or the like.

BRIEF DESCRIPTION OF THE SEVERAL VIEWS OF THE DRAWINGS

An embodiment of the invention will hereinafter further be expanded upon with reference to the drawings, in which.

DETAILED DESCRIPTION

Figure 1:
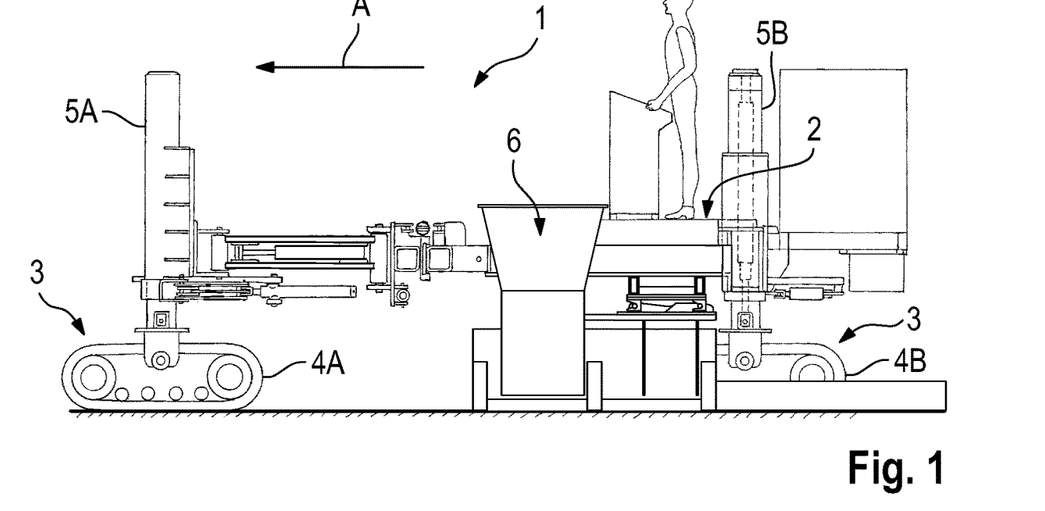
FIG. 1 shows an embodiment of a slipform paver in a side view.

As an example for a self-propelled construction machine 1, FIG. 1 shows a slipform paver in a side view without any conveyor, as described in detail in EP 1 103 659 B1. Since slipform pavers, as such, are part of the state of the art, only the components of the construction machine which are substantial for the invention are described.

The slipform paver exhibits a machine frame 2, which is carried by a chassis 3. The chassis 3 exhibits two front and two rear steerable running gears 4A, 4B, which are fastened to the front and rear lifting columns 5A, 5B. The direction of work (direction of travel) of the slipform paver is indicated with an arrow A.

The running gear 4A, 4B and the lifting columns 5A, 5B are a part of a drive device of the slipform paver for the execution of translatory and/or rotational motions. Preferably, hydraulic drives (not shown) for the running gear 4A, 4B as well as an internal combustion engine (not shown) belong to the drive device. The construction machine can be moved forwards or backwards with the running gear 4A, 4B.

The machine frame 2 can be moved with respect to the ground in elevation and slope through the raising and lowering of the lifting columns 5A, 5B. The construction machine thereby has three translatory and three rotational degrees of freedom.

The slipform paver has an apparatus 6 for the forming of concrete, which is hereinafter referred to as a concrete mixer. The concrete mixer 6 is a work device for the construction of a building structure having a predetermined form on the site and can be raised or lowered together with the machine frame 2.

Figure 2:
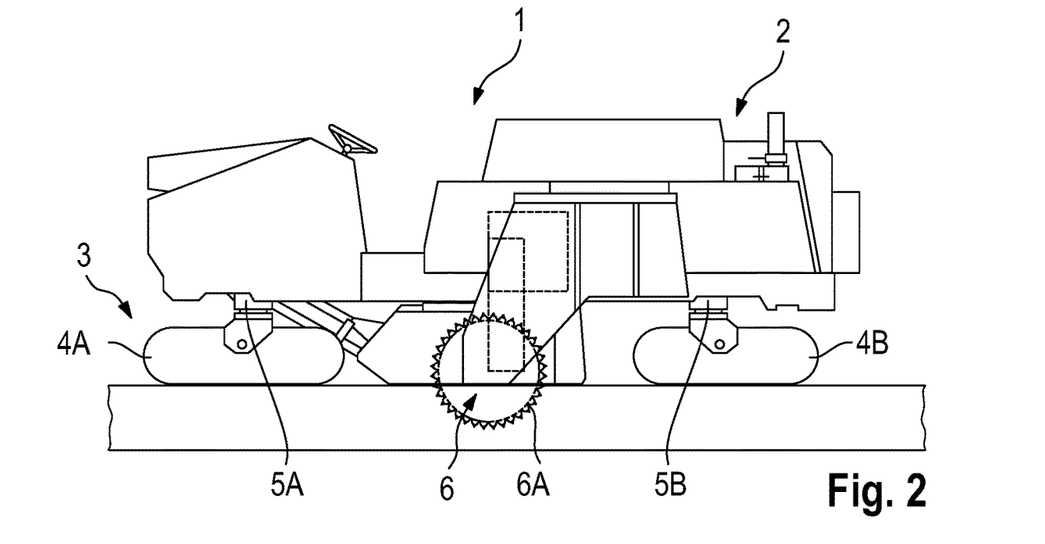
FIG. 2 shows an embodiment of a road milling machine in a side view.

As a further example, for a self-propelled construction machine 1, FIG. 2 shows a road milling machine in a side view. The road milling machine 1 also exhibits a machine frame 2 that is borne by a chassis 3. The chassis 3 once again exhibits front and rear running gear 4A, 4B, which are fastened to the front and rear lifting columns 5A, 5B. The road milling machine has a work device for the modification of the site. The milling device in this case is a milling device 6 having a milling roller 6A equipped with milling tools.

Figure 3:
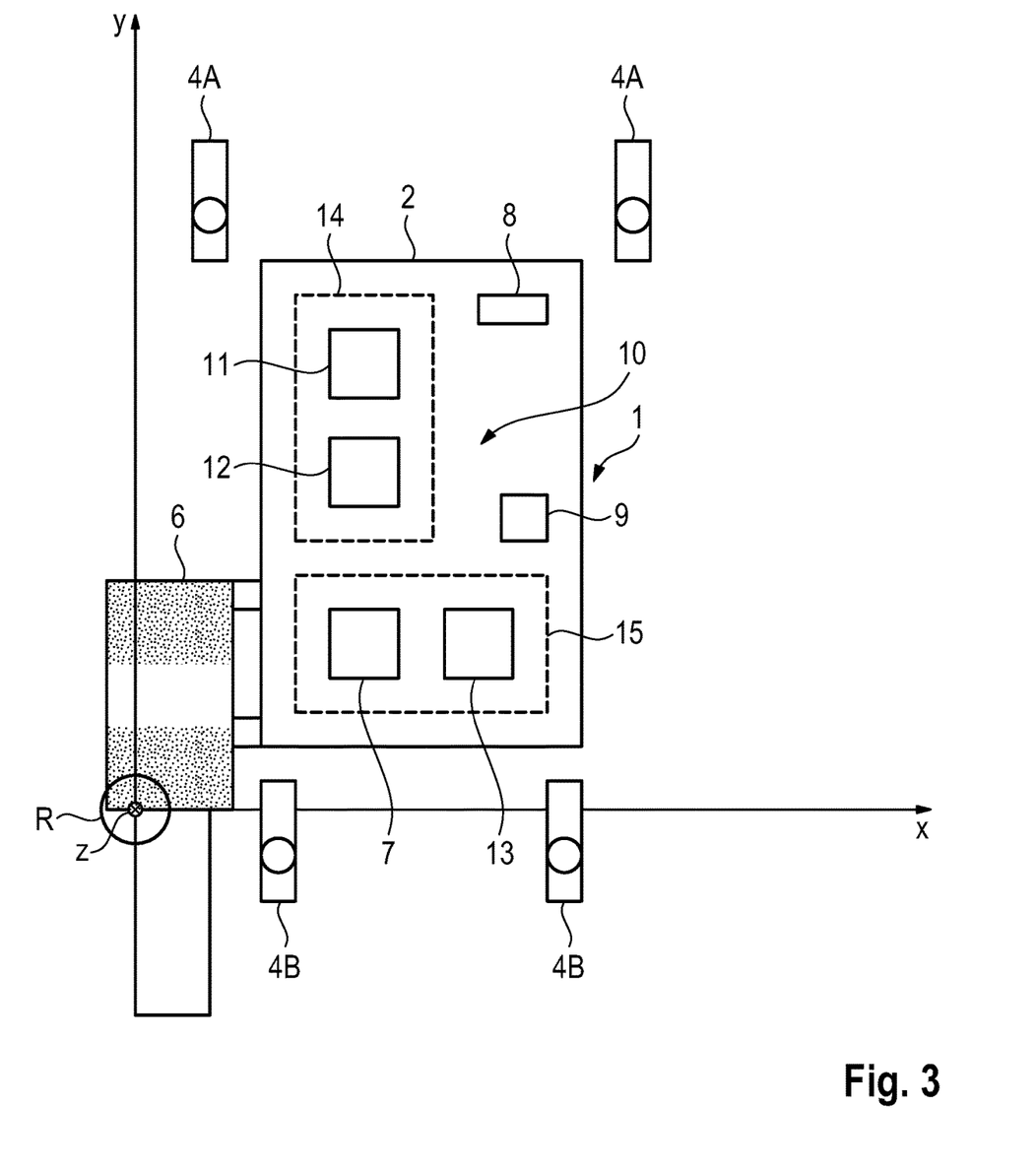
FIG. 3 shows a schematic representation of the slipform pavers.

FIG. 3 shows the self-propelled construction machine 1 in a Cartesian system of coordinates (X, Y, Z). The construction machine can be a slipform paver, a road milling machine or any other construction machine with a corresponding work device. In the case of this embodiment, the machine is a slipform paver which has a concrete mixer 6. The slipform paver with the concrete mixer is only represented in outline. It exhibits a machine frame 2, steerable running gear 4A, 4B and the concrete mixer 6.

The origin of the system of coordinates rests on a point of reference R of the slipform paver, wherein the point of reference R is determined to be the outer rear edge of the concrete mixer 6 in the direction of travel. This edge corresponds to the outer boundary of the building structure that is to be constructed.

The construction machine 1 has an automatic control that makes use of a total station (not shown) or a GNSS system (not shown). A control of this type is part of the state of the art. The control unit 7 (only shown schematically) of the construction machine is configured in such a way that the point of reference R on the construction machine moves along a determined route, which is to say on the route or at a distance to the route (equidistant). For this purpose, the control unit 7 controls the steering of the running gear 4A, 4B and the lifting cylinders 5A, 5B in such a way that the point of reference R moves along the route.

The construction machine 1 furthermore has an interface 8 for importing data which describes a target route. The data can be geometric specifications relating to the course of the target route W, for example, straights and curves, as well as lengths and angles. The data can however also be Cartesian coordinates (x, y, z) in a system of coordinates (X, Y, Z). The x, y coordinates can describe the location of the point of reference R in a horizontal plane and the z coordinates the elevation profile in a vertical plane. The data is transmitted off-site in an office. For the storage of this data, the construction machine exhibits a memory unit 9. The course of the target route in the horizontal plane can be described with a first target route and the elevation profile with a second target route. This data can be contained in a three-dimensional data set.

The construction machine, moreover, has a route modelling device 10, which includes an input unit 11, a display unit 12 and a processing unit 13. In the case of this embodiment, the input unit 11 and display unit 12 of the route modelling device 10 include a touch-sensitive screen 14 (touchscreen), which is represented with the dotted lines in FIG. 3. The processing unit 13 can be a component of a central control device 15 of the construction machine, whereby the control unit 7 can also be a component of the central control device 15. The central control device 15 can, for example, exhibit general processors, digital signal processors (DSP) for the continuous processing of digital signals, microprocessors, application-specific integrated circuits (ASIC), field-programmable gate arrays (FPGA) or other integrated circuits (IC) or hardware components, in order to be able to execute the individual process steps for the control of the construction machine. A data processing program (software) can run on the hardware components for the execution of the process steps.

The processing unit 13, as well as the input and display units 11, 12 (14) of the route modelling device 10 are configured in such a way that the hereinafter described functions can be executed.

Figure 4:
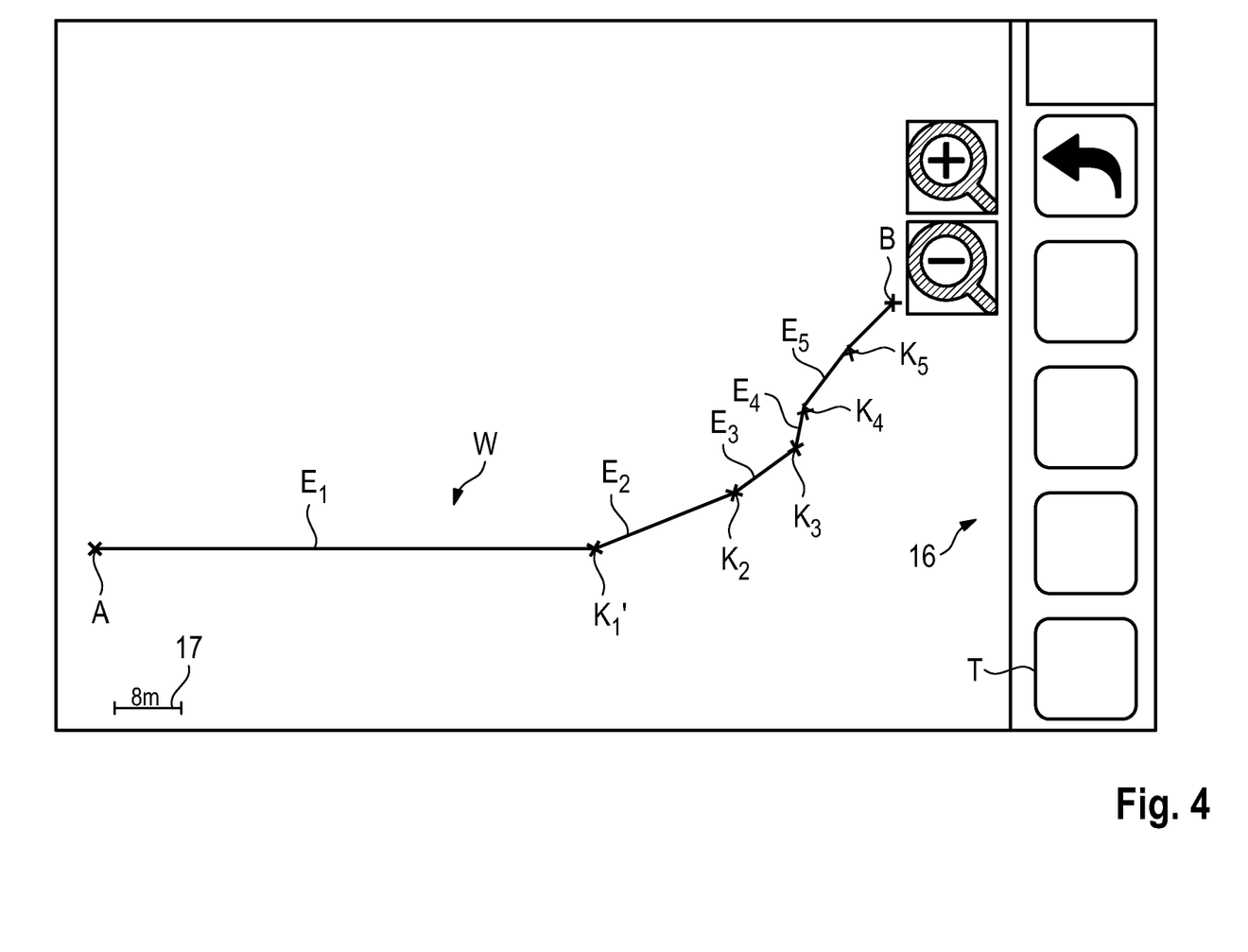
FIG. 4 shows a first screen view of the route modelling device.

FIG. 4 shows a first screen view of the touchscreen 14. On one side of the screen there is a control panel 16 with touch-sensitive buttons for the calling up of specific functions. In the centre of the screen, the target route W is represented. It is possible to display the entire target route W or a portion thereof for the motion of the construction machine in the horizontal plane or the route for the elevation profile on the screen. The two routes are modelled in an analogous manner. For this reason, only the route in the horizontal plane will hereinafter be described. In this embodiment the route between the starting point A and the end point B is shown. At the bottom edge of the image, there is a scale 17.

The route W is composed of a plurality of elements $E_1$, $E_2$, $E_3$ ... $E_n$. The elements $E_1$, $E_2$, $E_3$ ... $E_n$ can be straights or curves. At the transitions between the elements, the route W has kinks $K_1$, $K_2$, $K_3$ ... $K_n$, at which the direction of the route changes sharply, which requires a greater adjustment of the steering angle at this location.

By means of the input unit 11, which can also exhibit a separate keyboard, the user can input a threshold value for the magnitude of an intolerable kink, which is stored in the memory unit 9. In the control panel 16 of the touchscreen a button T is provided for the selection of a function, in order to verify the route for the presence of inadmissible kinks.

In the case in which the user touches this button T, a program routine is started up. The program routine can provide that, while passing along the route between a first verification point and a second verification point, in particular the starting and end points A, B, the deflection of the target route is calculated. In the case in which the left-sided and right-sided deflection at individual locations of the target route exceed the threshold value read out from the memory unit 9, it is concluded that there is a kink.

In the transition from, for example, the element $E_3$ to the element $E_4$, which is to say, at point $K_3$, the direction of the target route changes abruptly, in such a way that the magnitude of the difference between the left-sided deflection and the right-sided deflection is greater than the specified threshold value, and so a no longer tolerable kink exists. The magnitude of the difference between the left-sided deflection and the right-sided deflection is a measurement for the severity of the kink and the required modification of the steering angle at the kink.

The coordinates $(x_1, y_1; x_2, y_2 \ldots x_n, y_n)$ of the kinks $K_1$, $K_2$, $K_3$ ... $K_n$, are stored in the memory unit 9. The locations of the kinks $K_1$, $K_2$, $K_3$ ... $K_n$ are determined in the system of coordinates (X, Y) by the coordinates.

The operation will hereinafter be described solely in conjunction with a touchscreen. It is, however, possible to employ any suitable input device in place of the touchscreen or in addition to the touchscreen, to call up functions or to select points, for example, by clicking with a computer mouse.

Figure 5:
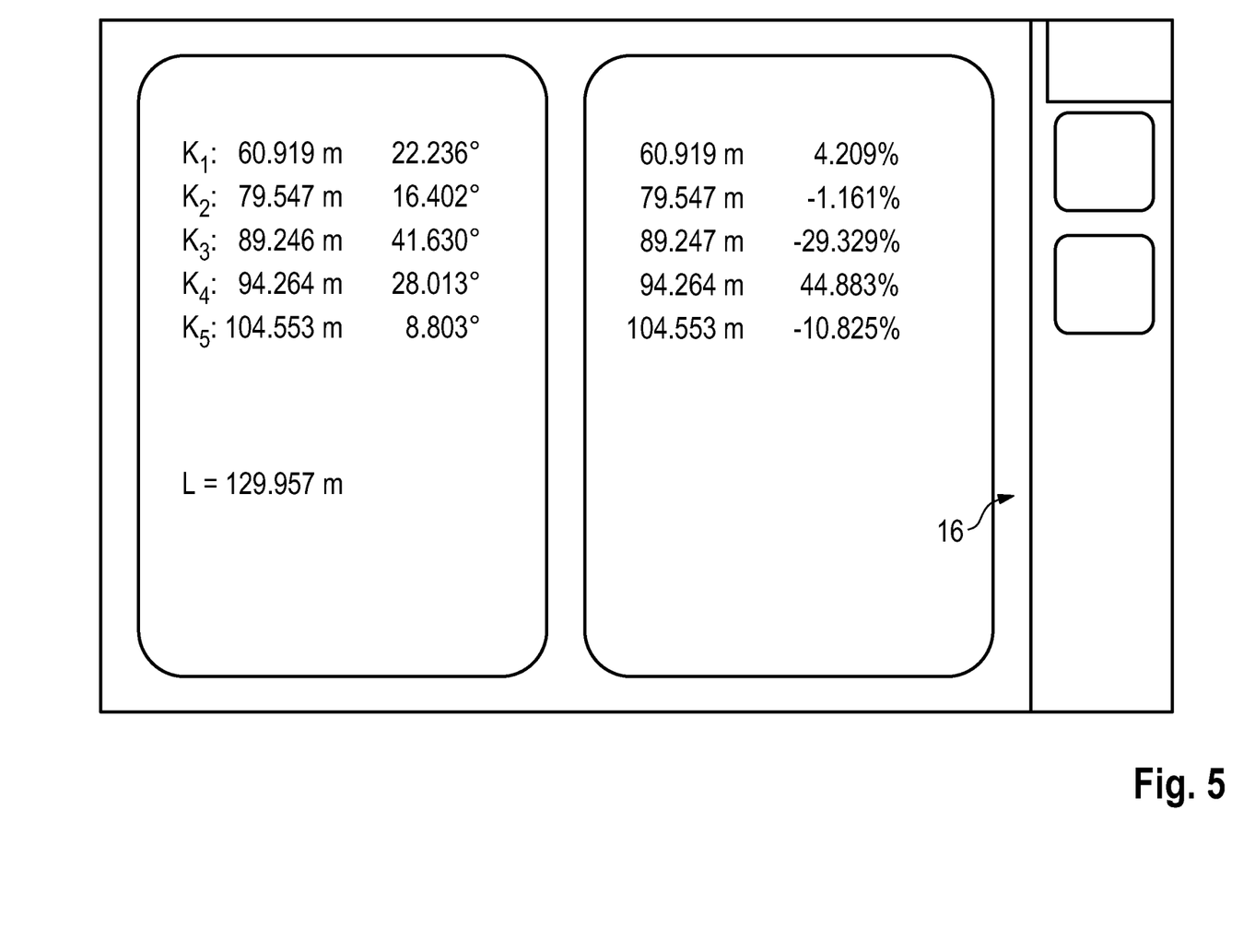
FIG. 5 shows a second screen view of the route modelling device.

The processing unit 13 determines the distance between the starting point A of the route W and of the respective kink K and the necessary change in direction. After having touched the button T, a new screen window is opened, which is depicted in FIG. 5, upon which the distance and the change in direction for the individual kinks $K_1$, $K_2$, $K_3$ ... $K_n$ are displayed. In this screen, the total length L of the target route W is also displayed, which is 129.957 m here. The first kink $K_1$ after 60.919 m requires, for example, a change of the direction of 22.236°. It is also possible to display kinks in the elevation profile in the screen window in an analogous manner, whereby the change in elevation at the kinks can be given in percent. FIG. 5 shows such a display on the right screen side.

Figure 6:
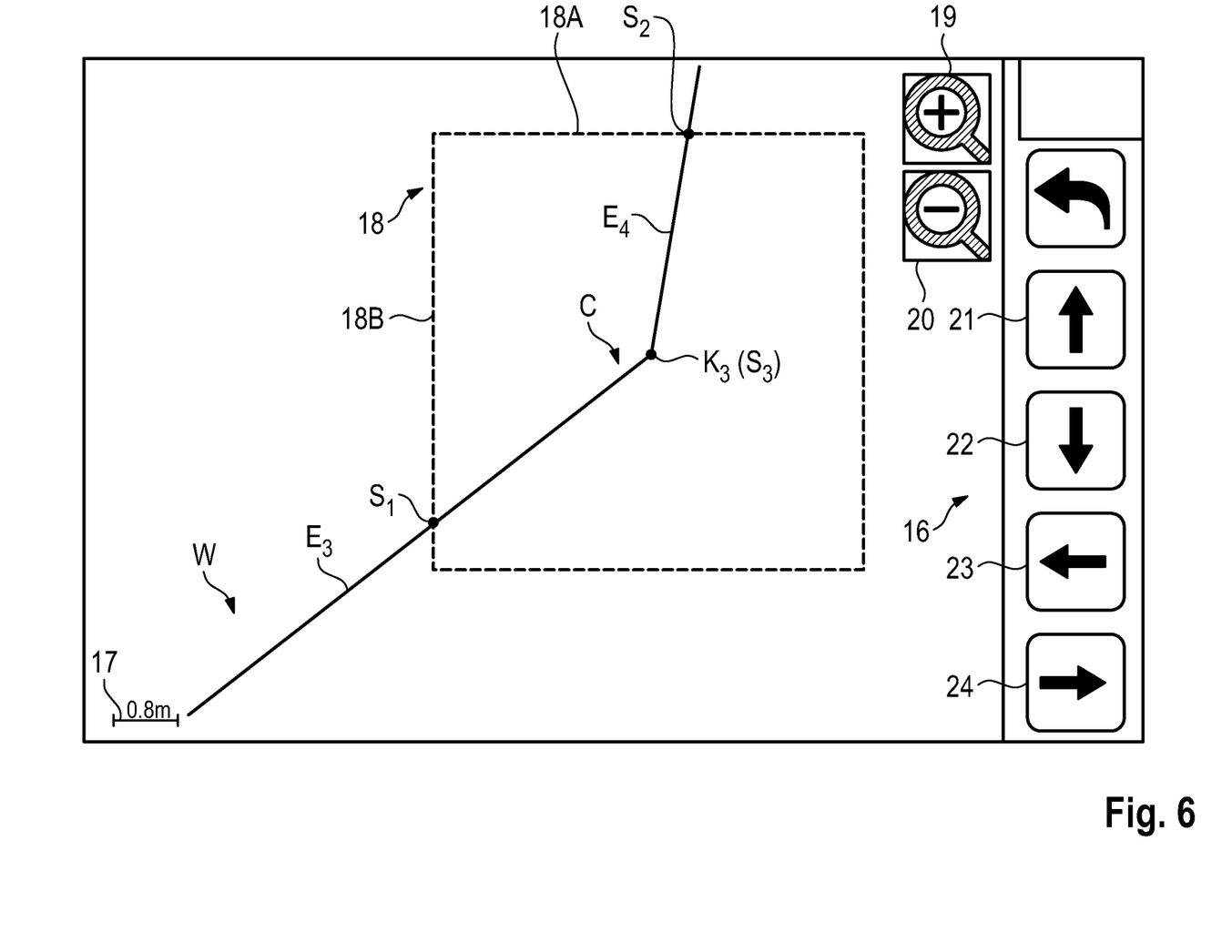
FIG. 6 shows a third screen view of the route modelling device.

The user is able to process the individual kinks $K_1$, $K_2$, $K_3$ ... $K_n$ in order. For this purpose, the user calls up one of the kinks, in such a manner that a new screen window is opened, which is shown in FIG. 6. This window displays, preferably in an enlarged representation, section C of the target route W, in which the respective kink K, for example, the kink $K_3$ is found. This section C is a section of the target route W which is found between a first point of support $S_1$ and a second point of support $S_2$. The previously calculated kink $K_3$ with the coordinates $(x_3, y_3)$ is found between the first and second points of support $S_1$, $S_2$. The first and second points of support $S_1$, $S_2$ are found on the border lines 18A, 18B of a frame 8, the location and size of which can be modified by the user. It is, for example, possible for the user to resize the frame 18 by touching one of the border lines 18A, 18B on the respective side. In the case in which the user enlarges or reduces, or alternatively moves the frame 18, then the first and second points of support $S_1$, $S_2$ are also moved, since the point of support is defined as the intersection of the border line and the target route W. The screen representation can be enlarged or reduced by touching the buttons 19, 20.

The kink point $K_3$ of the target route W forms a third point of support $S_3$, which the user can "reach for". The user is able to shift the third point of support $S_3$ (kink point) upwards, downwards, to the left and to the right by touching the buttons 21, 22, 23, 24 in the control panel 16. When the third point of support $S_3$ is shifted, the course of the section C of the target route W, which is stretched between the first and second points of support in the style of an "elastic band", is also shifted in the frame 18.

For section C of the target route W in the frame 18, the processing unit 13 calculates a smooth interpolation curve I, which, at the first point of support $S_1$ and the second point of support $S_2$, transitions without a kink to the portion of the target route W that is outside the frame 18. In the case in which the size and location of the frame 18 are changed and/or the third point of support $S_3$ is shifted, then the course of the interpolation curve I is also changed.

Figure 7:
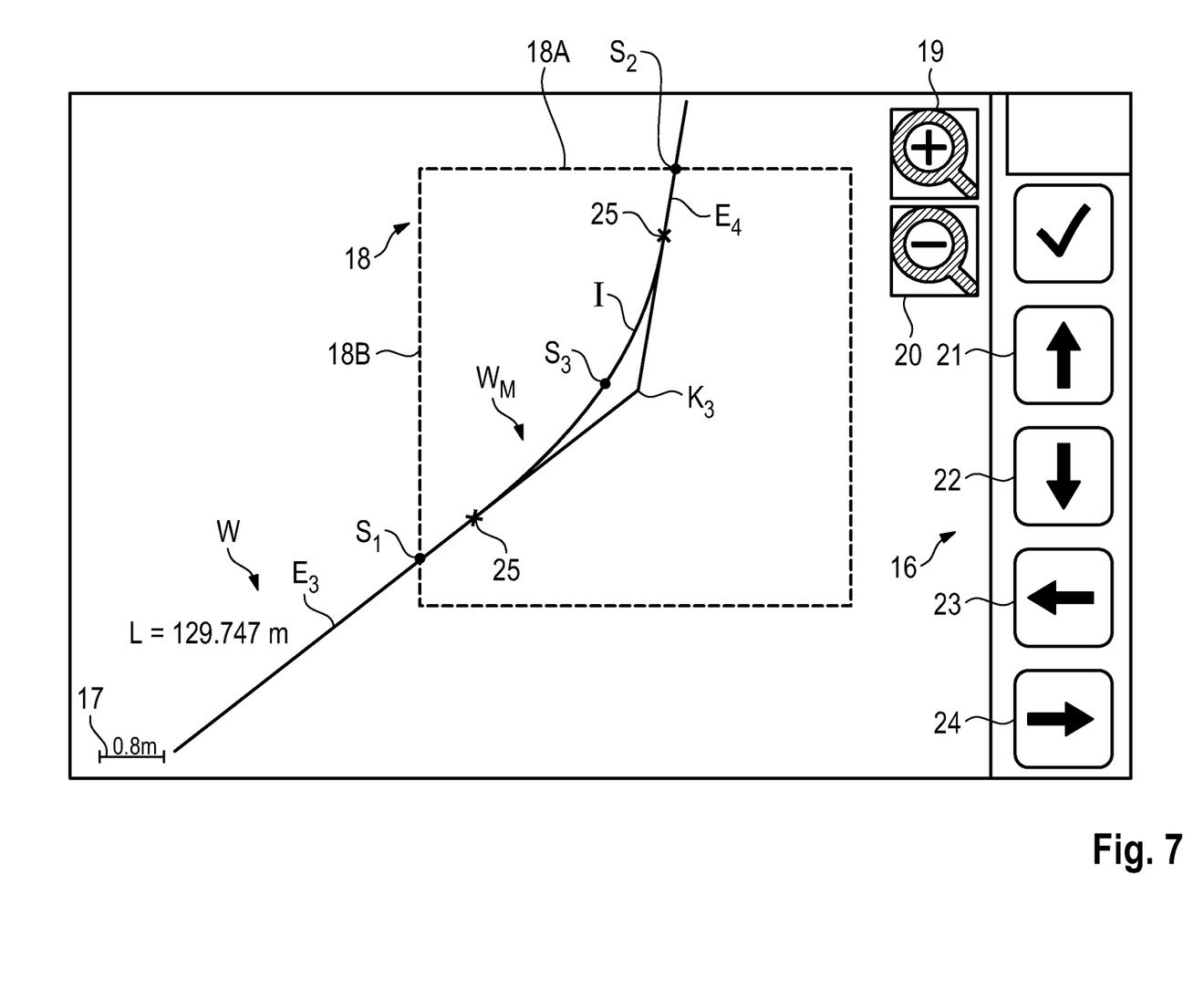
FIG. 7 shows a fourth screen view of the route modelling device.
Figure 8:
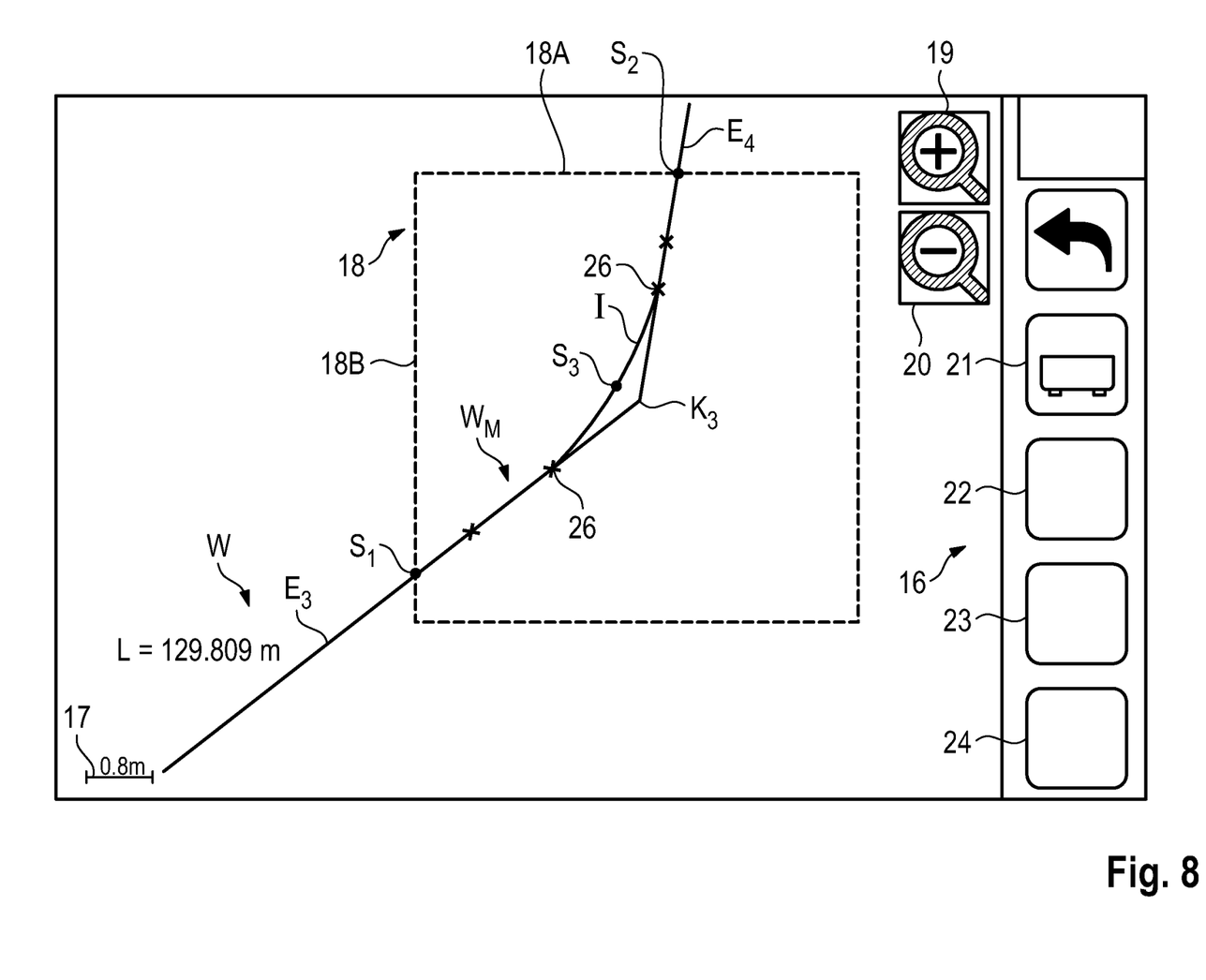
FIG. 8 shows a fifth screen view of the route modelling device.
Figure 9:
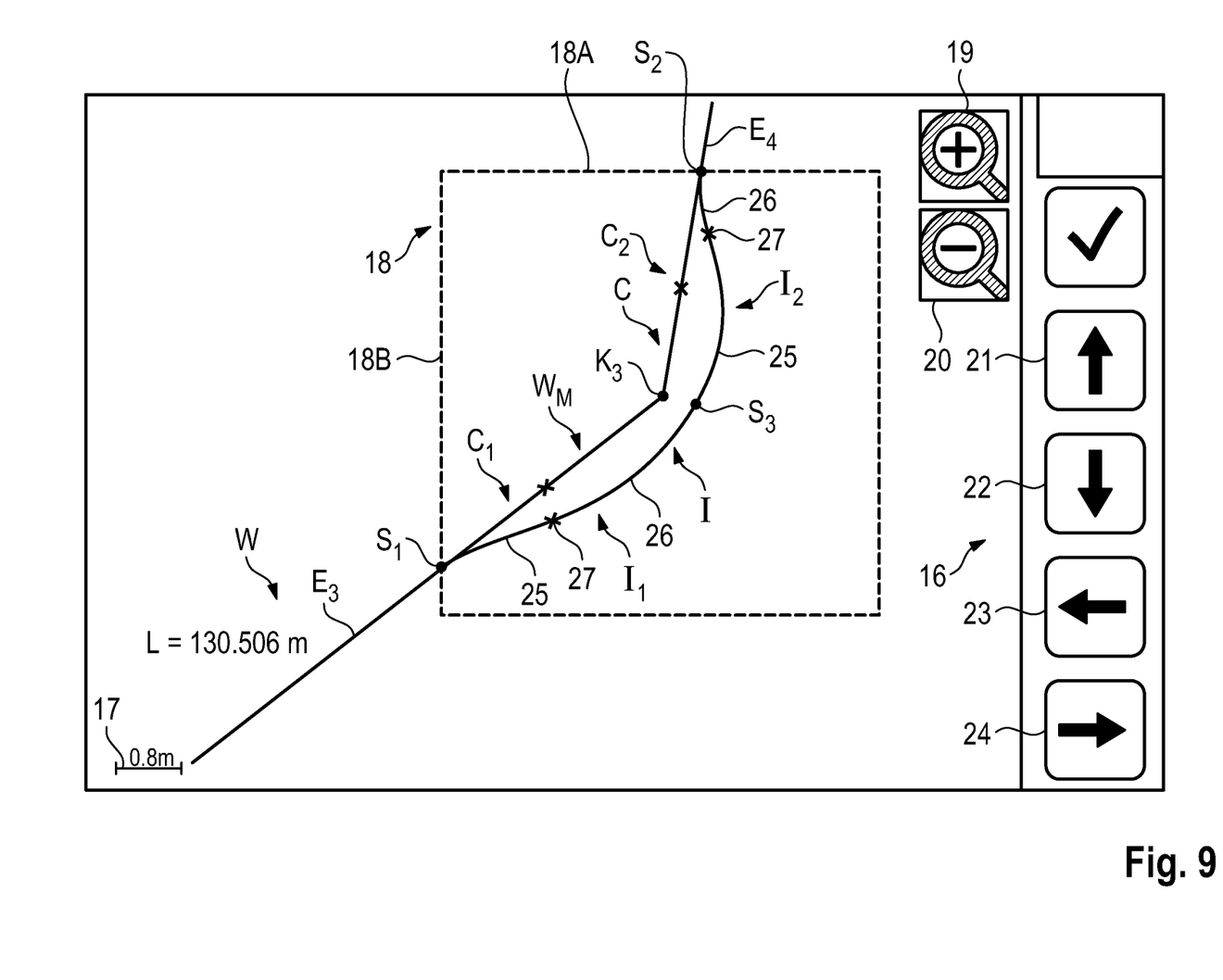
FIG. 9 shows a sixth screen view of the route modelling device.

The Figures show the change of the course of the interpolation curve I when the third point of support $S_3$ is shifted. It is shown that the interpolation curve I touches the original section C at two contact points 25 (FIG. 7), intersects said section at two intersections 26 (FIG. 8) or neither touches nor intersects it (FIG. 9). In the case in which the interpolation curve I is changed, the total length L of the target route W also changes, which is also displayed for the various interpolation curves. The total length L of the target route W for the case in which the interpolation curve neither touches nor intersects the original section is the longest one at 130.506 m (FIG. 9).

From among the various curves, the user can select an interpolation curve I which corresponds to their idea of an optimum approximation. When the user has selected the interpolation curve I, the section C of the target route W in which the target route has the kink $K_3$ is replaced by the selected interpolation curve I, thus producing a modelled target route $W_M$, which is stored in the memory unit 9.

The user can process the individual kinks $K_1$, $K_2$, $K_3$ . . . $K_n$ one after another, whereby, in each case, the modelled target route $W_M$ is newly calculated taking into consideration the specifications of the user. The control unit 7 then controls the drive device in such a way that the point of reference R on the construction machine 1 moves along the modelled route $W_M$.

In the case of this embodiment, the processing unit 13 calculates the interpolation curve I using a process that is known by the term biarc interpolation. This method will hereinafter be elucidated with reference to FIG. 9. The section C of the target route W in the frame 18 is subdivided into a first partial section $C_1$, which stretches between the first point of support $S_1$ and the third point of support $S_3$, and a second partial section $C_2$, which stretches between the second point of support $S_2$ and the third point of support $S_3$. The processing unit 13 in each case calculates an interpolation curve $I_1$, $I_2$, which is made up of two circles 25, 26, for the first and second partial sections $C_1$, $C_2$. The junctures of both circles 25, 26 are identified in FIG. 9 with the number 27. At the junctures 27, both circles 25, 26 have the same tangent, and so the interpolation curve I is a smooth curve. This also holds for the point of support $S_3$.

Figure 10:
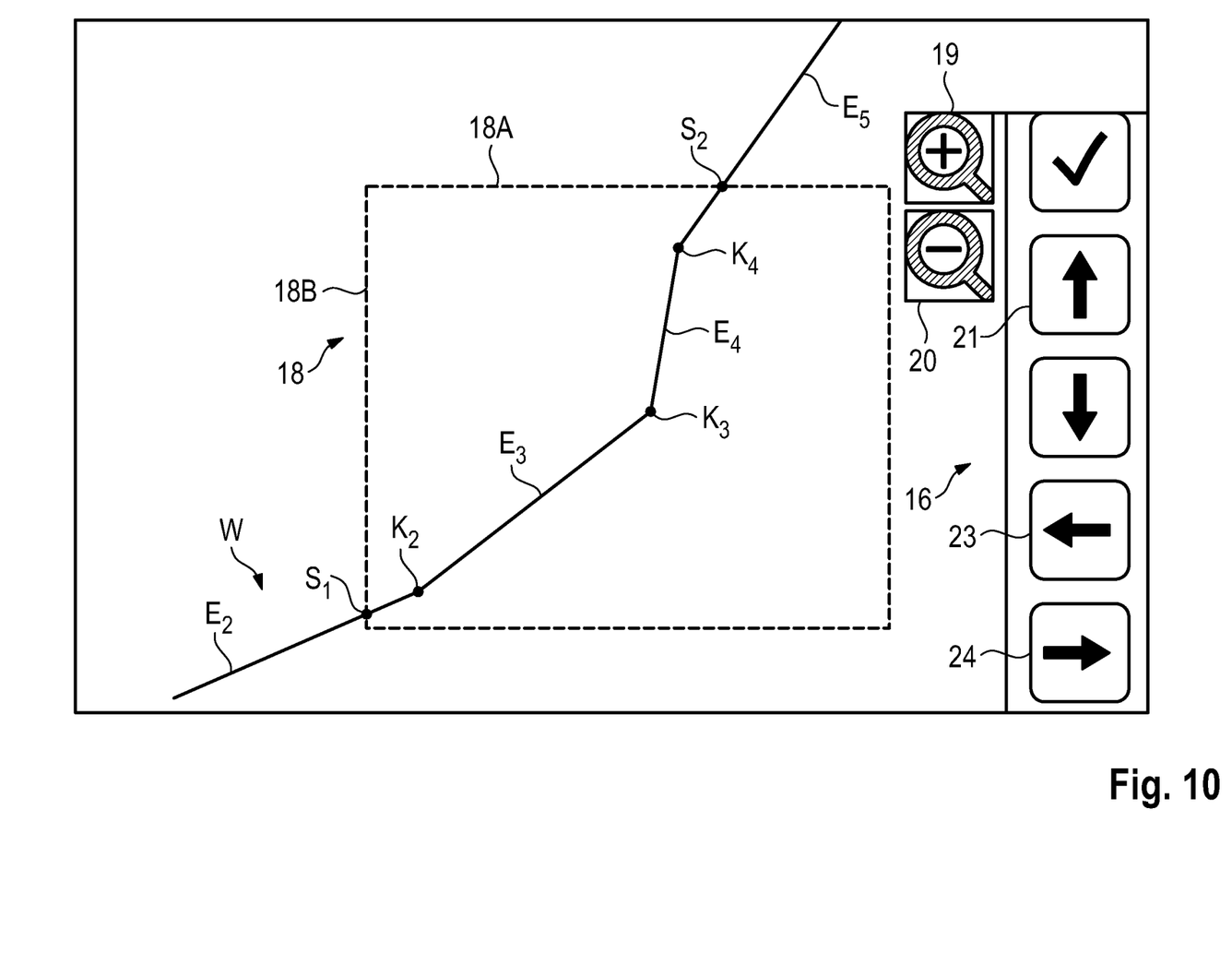
FIG. 10 shows a seventh screen view of the route modelling device.

FIG. 10 shows a further embodiment, which differs from the embodiment that is described in the FIGS. 6 through 9 inasmuch as the frame 18 does not only contain one kink, but rather a plurality of kinks. The frame 18 contains the kink $K_3$ and the neighbouring kinks $K_2$ and $K_4$. Elements that correspond to one another are given the same reference numerals.

Figure 11:
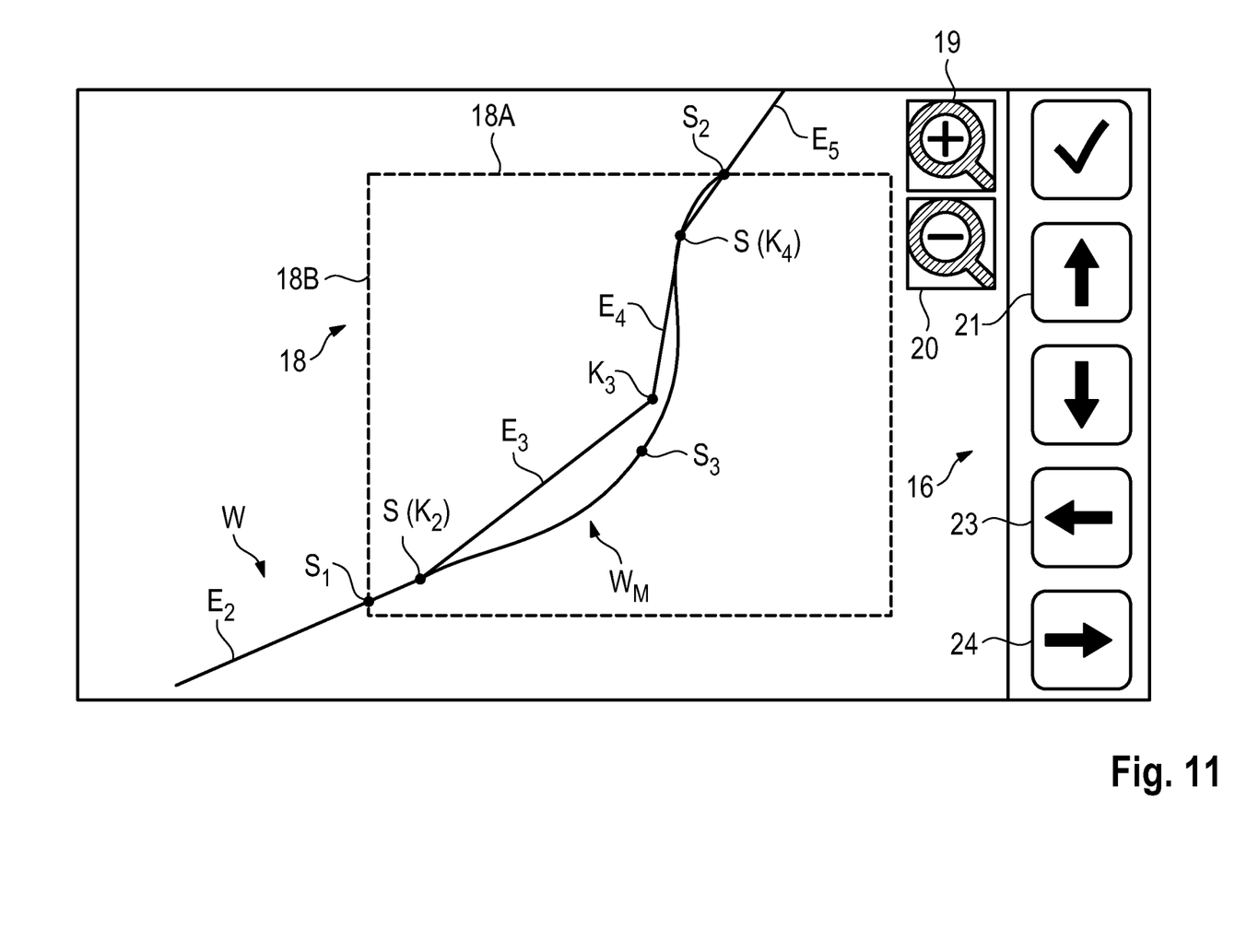
FIG. 11 shows an eighth screen view of the route modelling device.

FIG. 11 shows the screen window with the interpolation curve I calculated by the processing unit 13. In the case of this embodiment, the kink $K_3$, as well as also the neighbouring kinks $K_2$ and $K_4$ form points of support $S(K_2)$ and $S(K_4)$ of the interpolation curve I. The user is able to shift the point of support $K_3$ just like in the embodiment of the FIGS. 6 through 9, whereby the interpolation curve I, which stretches in the style of an "elastic band" between the points of support $S_1$ and $S_2$, changes its course. The interpolation curve I does however also run through the kinks $K_2$ and $K_4$, or alternatively the points of support $S(K_2)$ and $S(K_4)$, the locations of which remain unchanged. At the points of support $S_1$ and $S_2$ the interpolation curve once again transitions without a kink into the target route W.

What is claimed is:

1. A self-propelled construction machine comprising:
   a machine frame;
   a drive device configured to drive the construction machine in such a way that a point of reference on the construction machine executes translatory and/or rotational motions;
   a work device arranged on the machine frame for construction of building structures on a site or to modify the site;
   a processing unit configured to
      determine a position of a kink on a predetermined target route within a system of coordinates,
      cause at least one portion of the target route including the kink to be displayed on a display unit,
      in the at least one portion of the target route, determine a section in which the target route has the kink,
      calculate an interpolation curve for the section of the target route in which the target route has the kink, and
      determine a modelled route wherein the section of the route in which the target route has the kink is replaced by the interpolation curve; and
   a control unit configured to control the drive device in such a way that the point of reference on the construction machine moves along the modelled route.

2. The self-propelled construction machine of claim 1, further comprising an interface configured to import data describing the target route within the system of coordinates.

3. The self-propelled construction machine of claim 2, further comprising a memory unit configured for storage of the data describing the target route.

4. The self-propelled construction machine of claim 1, wherein the processing unit is configured to:
   determine a location of the target route, a left-sided deflection and a right-sided deflection, and
   compare the left-sided deflection and the right-sided deflection at the location of the target route with one another,
   whereby a presence of the kink and/or a magnitude of the kink is concluded based on a difference between the left-sided and right-sided deflection.

5. The self-propelled construction machine of claim 1, wherein the processing unit is configured, for determining the section in which the target route has the kink: determining a first point of support and a second point of support between which is found the section of the route, storing coordinates of the first and second point of support in a memory unit, wherein for the section of the target route in which the target route has the kink, a smooth interpolation curve is calculated which transitions into the target route at the points of support without any kinks.

6. The self-propelled construction machine of claim 5, wherein the processing unit is configured to:
   determine a third point of support in the section of the route in which the target route has the kink,
   store the coordinates of the third point of support in the memory unit, and
   calculate a smooth interpolation curve which passes through the third point of support for this section of the target route.

7. The self-propelled construction machine of claim 6, wherein the third point of support is the kink.

8. The self-propelled construction machine of claim 5, wherein at least the first and second points of support are predetermined points of support or user-selectable points of support.

9. The self-propelled construction machine of claim 8, wherein the processing unit is configured in such a way that the location of the predetermined or user-selected points of support is modifiable.

10. The self-propelled construction machine of claim 1, wherein the processing unit is configured in such a way that a section of the target route is determined or determinable in which the target route has at least two kinks, whereby the at least two kinks are points of support of the interpolation curve.

11. The self-propelled construction machine of claim 1, further comprising a touch-sensitive screen and/or a screen having an input device.

12. The self-propelled construction machine of claim 1, wherein the self-propelled construction machine is a slip-form paver and the work device exhibits an apparatus for forming flowable material, or is a road milling machine whereby the work device exhibits a milling or cutting roller.

13. The self-propelled construction machine of claim 1, wherein the processing unit is configured to determine a section of the target route in which the target route has at least two kinks, whereby the at least two kinks are points of support of the interpolation curve.

14. A method of controlling a self-propelled construction machine that has a machine frame, and exhibits a work device arranged on the machine frame for construction of building structures on a site or to modify the site, the method comprising:
   determining a position of a kink on a target route;
   displaying at least one portion of the target route in which the target route has the kink;
   determining a section in the at least one portion of the target route in which the target route has the kink;
   calculating an interpolation curve for the section of the target route in which the target route has the kink;
   determining a modelled route, wherein the section of the target route in which the target route has the kink is replaced by the interpolation curve; and
   controlling a drive device of the construction machine such that a point of reference on the construction machine moves along the modelled route.

15. The method of claim 14, further comprising:
   calculating left-sided and right-sided deflections at a location of the target route,
   comparing the left-sided deflection and the right-sided deflection at the location of the target route to one another,
   whereby a presence of the kink and/or a magnitude of the kink is concluded based on a difference between the left-sided and right-sided deflection.

16. The method of claim 14, wherein the step of determining the modelled route further comprises: determining a first point of support and a second point of support between which is found the section of the target route, whereby for the section of the target route in which the target route has the kink, a smooth interpolation curve is calculated which transitions into the target route at the points of support without any kinks.

17. The method of claim 16, further comprising determining a third point of support in the section of the target route, whereby a smooth interpolation curve which passes through the third point of support is calculated for the section of the target route in which the target route has the kink.

18. The method of claim 17, wherein the third point of support corresponds to the kink.

19. The method of claim 16, wherein at least the first and second points of support are predetermined points of support or user-selectable points of support.

20. The method of claim 14, further comprising determining a section of the target route in which the target route has at least two kinks, whereby the at least two kinks are points of support of the interpolation curve.

* * * * *